(12) United States Patent
Noble et al.

(10) Patent No.: US 7,302,571 B2
(45) Date of Patent: Nov. 27, 2007

(54) METHOD AND SYSTEM TO MAINTAIN PORTABLE COMPUTER DATA SECURE AND AUTHENTICATION TOKEN FOR USE THEREIN

(75) Inventors: Brian D. Noble, Ann Arbor, MI (US); Mark D. Corner, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 803 days.

(21) Appl. No.: 10/119,204

(22) Filed: Apr. 9, 2002

(65) Prior Publication Data

US 2003/0005300 A1    Jan. 2, 2003

Related U.S. Application Data

(60) Provisional application No. 60/283,445, filed on Apr. 12, 2001.

(51) Int. Cl.
*H04L 9/00* (2006.01)
*H04L 9/32* (2006.01)
*H04K 1/00* (2006.01)

(52) U.S. Cl. .................. 713/172; 705/67; 713/161; 713/168; 713/189; 726/2; 726/27; 726/28; 726/29

(58) Field of Classification Search ............ 713/189, 713/172; 705/67; 340/5.6; 379/211.05
See application file for complete search history.

(56) References Cited

U.S. PATENT DOCUMENTS 5,012,514 A    4/1991    Renton
5,091,939 A    2/1992    Cole et al.
5,226,080 A    7/1993    Cole et al.

(Continued)

FOREIGN PATENT DOCUMENTS

EP    0 447 386 A2    9/1991

(Continued)

OTHER PUBLICATIONS

Zadok, Erez, et al., Cryptfs: A Stackable Vnode Level Encryption File System, http://www.cs.columbia.edu/{ezk/research/cryptfs/cryptfs.html, Feb. 17, 1999, pp. 1-29.

(Continued)

*Primary Examiner*—Christopher Revak
*Assistant Examiner*—Trang Doan
(74) *Attorney, Agent, or Firm*—Brooks Kushman P.C.

(57) ABSTRACT

A method and system to maintain portable computer data secure and an authentication token for use in the system are provided. The present invention provides for fine-grained authentication and full security of a laptop file system. The laptop disk is encrypted and each time data is fetched from the disk the laptop sends a short message requesting a decryption key from an authentication token worn or associated with the proper laptop user. If the user and his/her token are "present," then access is allowed. If the user and his/her token are not "present" (i.e., within a predetermined radius), then access is disallowed and all in-memory data is flushed to the disk. The user wears the small authentication token that communicates with the laptop over a short-range, wireless link. Whenever the laptop needs decryption authority, it acquires it from the token; authority is retained only as long as necessary.

12 Claims, 2 Drawing Sheets

U.S. PATENT DOCUMENTS

| | | |
|---|---|---|
| 5,325,430 A | 6/1994 | Smyth et al. |
| 5,375,243 A | 12/1994 | Parzych et al. |
| 5,544,321 A | 8/1996 | Theimer et al. |
| 5,611,050 A | 3/1997 | Theimer et al. |
| 5,623,637 A | 4/1997 | Jones et al. |
| 5,657,470 A | 8/1997 | Fisherman et al. |
| 5,729,608 A * | 3/1998 | Janson et al. ............ 713/171 |
| 5,757,916 A | 5/1998 | MacDoran et al. |
| 5,836,010 A | 11/1998 | Kim |
| 5,889,866 A | 3/1999 | Cyras et al. |
| 6,070,240 A | 5/2000 | Xydis |
| 6,088,450 A | 7/2000 | Davis et al. |
| 6,189,099 B1 | 2/2001 | Rallis et al. |
| 6,189,105 B1 * | 2/2001 | Lopes ...................... 726/20 |
| 6,317,500 B1 * | 11/2001 | Murphy .................. 380/258 |
| 6,425,084 B1 * | 7/2002 | Rallis et al. ............ 713/185 |
| 6,714,649 B1 | 3/2004 | Masuda et al. |
| 6,792,536 B1 | 9/2004 | Teppler |
| 7,096,504 B1 | 8/2006 | Tagawa et al. |
| 2002/0138748 A1 | 9/2002 | Hung |

FOREIGN PATENT DOCUMENTS

| | | |
|---|---|---|
| EP | 1 223 495 A1 | 7/2002 |
| EP | 1223495 A1 * | 7/2002 |
| WO | WO95/16238 | 6/1995 |
| WO | WO9516238 * | 6/1995 |
| WO | WO9516238 A1 * | 6/1995 |
| WO | WO 01/20463 | 3/2001 |

OTHER PUBLICATIONS

Provos, N., Encrypting Virtual Memory, Proceedings of The Ninth USENIX Security Symposium, pp. 35-44, Denver, Colorado, Aug. 2000.

Stajano, F., et al., The Resurrecting Duckling: Security Issues For Ad-Hoc Wireless Networks, Securing Protocols, 7th International Workshop Proceedings, Lecture notes in Computer Science, 1999.

* cited by examiner

METHOD AND SYSTEM TO MAINTAIN PORTABLE COMPUTER DATA SECURE AND AUTHENTICATION TOKEN FOR USE THEREIN

CROSS-REFERENCE TO RELATED APPLICATIONS

This application claims the benefit of U.S. Provisional patent application Ser. No. 60/283,445 filed Apr. 12, 2001 and entitled "Zero Interaction Authentication."

BACKGROUND OF THE INVENTION

1. Field of the Invention

This invention relates to methods and systems to maintain portable computer data secure and authentication tokens for use therein.

2. Background Art

Portable computers such as laptops are vulnerable to theft, greatly increasing the likelihood of exposing sensitive files. Storing laptop data in a cryptographic file system does not fully address this problem. Such systems ask the user to imbue them with long-term authority for decryption, but that authority can be used by anyone who physically possesses the machine. Forcing the user to frequently reestablish his identity is too intrusive, encouraging him or her to work around or disable encryption entirely.

Safeware, an insurer of computer equipment, estimates that 387,000 laptops were stolen during the 2000 calendar year. For many users, the true cost of laptop theft is not the lost hardware, but rather the exposure of sensitive data. There have been at least three high-profile losses within the past year. A laptop containing two years of financial data and internal company e-mail was stolen from Qualcomm founder Irwin Jacobs. The U.S. Department of State reported the loss of a laptop that identified sources and methods used to gather nuclear proliferation intelligence. Such events are not limited to the United States; a British MI6 agent left a laptop describing field methods in a taxi. All of these laptops were insecure.

Once an adversary has physical possession of a laptop, he has full access to all of the information on it. This is true even with secure login facilities; such protections can be bypassed by removing its disk and examining it at leisure. The best defense against physical inspection is to leave all data on the machine encrypted without exposing the decryption keys. Current cryptographic file systems do not provide this property.

To see why, consider the role played by user authentication. At login time, a user proves his identity to the machine, typically with a password. If successful, the machine is empowered to act on the user's behalf. The duration for which these rights persist is a matter of policy. Often, they last until the user explicitly logs out, though some systems require users to reauthenticate infrequently.

This model of authentication is troublesome when used with file system encryption. Authentication provides the keys for decrypting file system data, either directly or indirectly. However, while authentication persists, anyone in physical possession of the machine can act as that user; authentication transfers authority from the user to the machine.

If the reauthentication period is long, the window of vulnerability is correspondingly wide. This is a dangerous proposition for laptops. Requiring frequent reauthentication limits this vulnerability, but places a substantial burden on the user. This encourages him to leave his files decrypted or find a way to automatically renew authentication. In either case, the protection afforded by encryption is forfeit.

The discussion so far has focused on password-based authentication, but other methods suffer a similar fate. One alternative is a secure device, such as a smartcard, that provides decryption services. Such a device is inserted into the laptop and either transfers its keys to the machine or must remain attached for continued operation. The former is identical to password-style authentication. The latter encourages a user to leave the card in the laptop, providing little protection.

Biometric authentication schemes intrude on users in two ways. The first is the false-negative rate: the chance of rejecting a valid user. For face recognition, this ranges between 10% and 40%, depending on the amount of time between training and using the recognition system. For fingerprints, the false-negative rate can be as high as 44%, depending on the subject. The second stems from physical constraints. For example, a user must touch a special reader to validate his fingerprint. Such burdens encourage users to disable or work around biometric protection. A notable exception is iris recognition. It can have a low false-negative rate, and can be performed unobtrusively. However, doing so requires three cameras; an expensive and bulky proposition for a laptop.

The Jones, et al., U.S. Pat. No. 5,623,637, provides for an encrypted data storage card including smartcard integrated circuit for storing an access password and encryption keys. Disclosed within is a method and apparatus for storing access passwords, encryption or decryption keys, or digital signatures, in a smart-card integrated circuit interconnected with a data access mechanism (hard drive) which are integral parts of a memory card of a laptop or notebook computer.

The Cyras, et al., U.S. Pat. No. 5,889,866, provides for a method and apparatus for controlling access to detachably connectable computer devices using an encrypted password. Of interest is a method and apparatus for controlling access to a laptop or notebook computer using an encrypted password. The laptop computer includes a utility software that prompts the user for password assignment, password entry, etc. Encryption logic encrypts the entered password and stores the encrypted password as the key on the computer. Furthermore, if the encrypted entered password is the same as the key and, thus, the entered password is the same as the assigned password, an enable signal is sent to render the computer operable.

The Rallis, et al., U.S. Pat. No. 6,189,099, provides for a notebook security system (NBS). Disclosed is a multi-level security system for preventing unauthorized use of a notebook, or laptop computer. A validation record stored on the computer's hard disk contains an encrypted key device serial number and an encrypted hard disk serial number. A program that is automatically invoked at computer power-up, or reset, implements the user validation procedure. The procedure permits entry past a first security level if the key device serial number matches the unencrypted number in the validation record. If the first-level validation is successful, the procedure then uses the encryption key to decrypt the hard disk serial number found in the stored validation record. The procedure permits entry past the second security level only if the validation record is properly decrypted and the actual hard disk serial number matches the decrypted number. A failure at any step in the user-validation procedure will immediately power down the computer, thereby rendering it useless to a thief not possessing the required key device.

The patent document to Jones, et al., WO 95/16238, provides for a secure computer memory card. Described within is a method and apparatus for password protecting a computer. An integrated circuit incorporated within the computer's memory card may store public and private key values used to encrypt and decrypt data stored on the memory card or elsewhere on the host computer.

The Xydis U.S. Pat. No. 6,070,240, provides for a method of controlling a computer system comprising the steps of: disposing a computer in an operating space and placing the computer in a lockout mode to prevent operation of the computer software by a user. It also provides for a transponder that transmits an authorized user code in the operating spaced and identifying the user owning the transponder. The authorized user is then free to operate the computer software while the sensing for the presence of a transponder transmitting an authorized user code in the operating space is continued.

The Davis et al., U.S. Pat. No. 6,088,450, provides for a wireless authentication system to control an operating state of a computer based on the proximity of an authorized user to the computer. The wireless authentication system comprises a security device implemented within the computer and a user authentication token ("token") in possession of the authorized user. A Challenge/Response protocol is configured between the security device and the token. The first successful Challenge/Response message exchange between the security device and the token places the node in an operational state allowing the authorized user access to the contents and/or networked resources of the node. Later Challenge/Response message exchanges are set to occur periodically to check whether the authorized user possessing the token has left the node unattended thereby causing the node to be placed in a non-operational state.

The MacDoran et al., U.S. Pat. No. 5,757,916, provides for a method and apparatus for authenticating the identity of a remote user entity where the identity of such user entity is authenticated by use of information specific to geodetic location of the user entity but that changes constantly, making "spoofing" the host device extremely difficult. The invention is preferably implemented utilizing satellite positioning technology to produce the identifying information.

The Theimer, U.S. Pat. Nos. 5,544,321 and 5,611,050, provide for a method for superimposing prespecified locational, environmental, and contextual controls on user interactions, including interactions of mobile users, with computational resources. A system is described for electronically monitoring contextual information concerning users and machines, including state and locational information including proximity. Interaction policies, including user specified interaction policies, may be registered on an identifiable address path. Methods are described for detecting, selecting and controlling computer-controlled devices, based; on the proximity of the device to the user, the current context of the user, the location of other nearby users and devices, and the current state of the devices. Temporary transfer of control, including exclusive control, of particular computers and computer-controlled devices to individual users based on the context and environment in proximity to those computing devices is also described.

The following U.S. patents are also generally related to the present invention: U.S. Pat. Nos. 5,012,514; 5,091,939; 5,226,080; 5,375,243; 5,657,470; and 5,836,010.

SUMMARY OF THE INVENTION

An object of the present invention is to provide an improved method and system to maintain portable computer data secure and an authentication token for use therein.

In carrying out the above object and other objects of the present invention, a system to maintain data stored on a portable computer secure is provided. The system includes an authorization client for use on the portable computer for making requests and a security device to be associated with an authorized user of the portable computer. The device includes an authorization server for supplying responses to the requests. The system further includes a communication subsystem for wirelessly communicating the requests and the responses to the server and the client, respectively, within a range, and a cryptographic subsystem for use on the portable computer for encrypting the data to obtain corresponding encrypted data when the security device is outside the range of the communication subsystem and for decrypting the encrypted data when the security device is back within the range.

The requests preferably include cryptographic requests for cryptographic information. The server supplies the cryptographic information in response to the cryptographic requests and the cryptographic subsystem utilizes the cryptographic information to either encrypt or decrypt the data.

The requests also preferably include polling requests and the cryptographic information includes keys which may be encrypted.

The keys may include user and group keys.

The system preferably includes a mechanism for establishing a binding between the portable computer and the security device to ensure that the security device only responds to a portable computer with a valid binding.

The security device is preferably an authorization token.

The computer may have a low speed memory and high speed memory wherein the data stored in the high speed memory is not encrypted and the data stored in the low speed memory is encrypted.

The cryptographic subsystem typically includes encrypted keys and the cryptographic information includes keys for decrypting the encrypted keys.

Preferably, the requests including the polling requests are encrypted.

Further in carrying out the above objects and other objects of the present invention, a method to maintain data stored on a portable computer secure is provided. The method includes providing an authorization client for use on the portable computer for making requests and providing a security device to be associated with an authorized user of the portable computer. The security device includes an authorization server for supplying responses to the requests. The method further includes wirelessly communicating the requests and the responses to the server and the client, respectively, within a range, encrypting the data to obtain corresponding encrypted data when the security device is outside the range, and decrypting the encrypted data when the security device is back within the range.

The method may further include establishing a binding between the portable computer and the security device to ensure that the security device only responds to a portable computer with a valid binding.

Still further in carrying out the above objects and other objects of the present invention, an authorization token for use in a system to maintain data stored on a portable computer secure is provided. The token includes an authorization server for supplying encrypted responses to encrypted requests and a transceiver for receiving the requests and transmitting the responses to the portable computer.

The requests preferably include cryptographic requests for cryptographic information and the server supplies the cryptographic information in response to the cryptographic requests.

The requests may further include polling requests.

The cryptographic information preferably includes keys which may be encrypted.

The keys may include user and group keys.

The system of the invention provides proof of an authorized user's presence without requiring explicit user actions. With the system, a laptop user also wears a small authentication token. The laptop and token communicate via a short-range wireless link, such as Bluetooth. Whenever the laptop must encrypt or decrypt data, it asks the token to supply the key. The token holds all long-term authority to act on the user's behalf; the laptop holds authority only when necessary. It relinquishes authority ability of the token's removal from range.

The short range over which the wireless network operates provides constant assurance that the user is in possession of the laptop. Since the token is worn, it is much less vulnerable to loss or theft than a device that is carried and often set down. The token responds to operational requests without user intervention. Provided that performance does not suffer, the user has no reason to disable or work around file system encryption.

The core idea of the invention is a relatively simple one, but the details are subtle. The system should not noticeably impact file system performance. Interactions between the laptop and token are on the order of milliseconds, so one must try to overlap them with disk I/O or move them out of the critical path of user requests. Tokens respond only to the user's laptop; this prevents "tailgating" attackers from authenticating their own laptops via other, nearby tokens. It supports many-to-many relationships between users and machines, and does not prevent legitimate users from sharing data with one another. The file system is secured quickly upon a user's departure to prevent physical attack, and is recovered quickly to minimize the performance impact on a user's return.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a block diagram which demonstrates two issues in the invention's access control mechanism; first, the file bar should be readable by anyone in the student's group; however, the file key is sealed by the user Alice, and the group faculty; second, Alice can maliciously modify her kernel and decrypt the file bar, even though she is not permitted to;

DETAILED DESCRIPTION OF THE PREFERRED EMBODIMENTS

A primary goal of the method and system of the present invention is to provide encryption in a way that neither affects performance nor burdens the user. All on-disk objects are encrypted for safety, but all cached objects are decrypted for performance. With its limited hardware and networking performance, the token typically is not able to encrypt and decrypt file pages without significant performance penalty. Instead, the file keys are encrypted and stored on the laptop's disk. Authorized tokens possess the ability to decrypt file keys on demand. Steps are taken to either overlap key acquisition with disk I/O, or move it out of the critical path. When the user is out of range, the invention encrypts cached objects for safety. These encrypted pages are retained in the cache to minimize recovery time when the user returns.

Trust and Threat Model

It is assumed that some collection of users and laptops belong to a single administrative domain, within which data can be shared. The domain rant includes at least one trusted authority to simplify key management and rights in revocation. However, the system must be usable even when the laptop is disconnected from the rest of the network, disallowing trusted third parties during normal operation.

A focus of the invention is to defend against attacks involving physical possession of a laptop or proximity to it. Examples of the former include gaining root access from the console, removing the disk for off line inspection, etc. Examples of the latter include the observation, modification, and insertion of messages between the laptop and token. The invention does not defend against traditional network-based exploits such as buffer overflow attacks. The invention is orthogonal to techniques that address them. No means are provided for defending against proximity-based, denial-of-service attacks: jamming of the channel between the laptop and the token.

Key-Encrypting Keys

In the invention, each on-disk object is encrypted by some symmetric key, $K_e$; each $K_e$ need not be unique. The link connecting the laptop and token is slow, and the token is typically much less powerful than the laptop. Therefore, decryption preferably takes place on the laptop, not the token. The file system stores each $K_e$, encrypted by some key-encrypting key, $K_k$; this is written as $K_k(K_e)$. Only tokens know key-encrypting keys and they never divulge them. A token with the appropriate $K_k$ can decrypt $K_e$, and hence enable the read of any file encrypted by $K_e$.

The invention appeals to UNIX file protection and identity semantics to assign key-encrypting keys. Access to a file in this model is determined by dividing the universe of users into three distinct classes: the file's owner, members of the file's group, and anyone else. This last set is referred to as the world. Each user has a particular identity, and is a member of one or more groups. A user key, $K_u$, is assigned to each user, and a group key, $K_g$, is assigned to each group. File encryption keys are sealed with their corresponding $K_u$ and $K_g$. A user's authentication token holds his user key and one group key for each group to which the user belongs. The administrative authority is responsible for distributing and revoking these keys.

This scheme has important implications for sharing in the invention. Members of a group have the implicit ability to share files belonging to that group, since each member has the corresponding $K_g$. However, this requires re-keying a group when a member leaves. This can be performed by the remaining group members, since they hold both the old and new group keys.

In addition to per-user and per-group access control, UNIX systems may also grant or deny access to any user authorized to log in to that machine. A corresponding world key is not provided for two reasons. First, since the world key covers most of the file keys on every machine, its exposure is particularly damaging. Second, re-keying costs with world keys must be paid each time any user leaves the system, rather than the more compartmentalized re-keying necessary for groups. The invention does not leave world-readable files unencrypted, since this does not limit access only to legitimate users of the system. Anyone, whether legitimate or not, can remove the disk and examine unencrypted files.

The consequence of these decisions is that the invention provides a strictly more restrictive access control model than UNIX. Namely, one must be in at least the group to read a file. This is best viewed as a policy decision. Since the group key mechanisms are already present, world keys could be added to the invention without additional complexity. However, doing so would make the system harder to administer and less secure.

Laptop/Token Interaction

Suppose a token receives a request that requires a key-encrypting key available to the token. How does the token know that this request is coming from the owner's laptop? To see why this is important, consider the case of a tailgating attacker with a purloined laptop but no token, sitting near a legitimate user. It would be easy to force the stolen laptop to generate key decryption requests that would require the legitimate user's key-encrypting key. If the legitimate token were to respond, the system would be compromised.

To prevent this, the invention provides a mechanism that establishes bindings between tokens and laptops. A token only responds to laptops with valid bindings. In the model of the invention, binding happens at login time, and is valid for the duration of the login shell. However, this is a policy decision, and is easily changed to require more or less frequent binding.

Each token and laptop possesses an asymmetric key pair. Ordinarily, mutual authentication would involve the arbitration of a third party to vouch for the validity of public keys. However, laptops can operate while disconnected from the network. During that time, access to a trusted third party is impossible, but the system must be usable. Instead, the user is the trusted third party. The user connects the token to the machine, and this physical connection acts as proof that the user means to use this laptop with that token. The user must then remove the token to use the file system, preventing users from leaving the token connected. While this is somewhat intrusive, it is a rare event, and does not require much beyond the standard login process.

Since users can use more than one machine, a token may be bound to more than one laptop. Likewise, a laptop may have more than one token bound to it. Once a binding exists, each party has the other's public key, and can use this to distribute session keys to protect laptop/token communication. Session keys are renegotiated whenever the user leaves the laptop's range and later returns, though one could provide shorter sessions easily.

Assigning Encryption Keys

What is the right granularity at which to assign file encryption keys? On the one hand, a small grain size reduces the data exposed if a file key is revealed. On the other hand, a larger grain size provides more opportunity for key caching and re-use.

A goal of the present invention is to hide the latency of key acquisition by overlapping it with physical disk I/O and to amortize acquisition by re-using keys when appropriate. In light of this, file keys are assigned on a per-directory basis. Since files in the same directory tend to be used together, many file systems place them in the same cylinder group to reduce seek time. This, in turn, reduces the cost of consecutive I/O operations on files within the same directory, making it difficult to hide key acquisition costs. Since each file in a directory shares the same file key, key acquisition costs can be amortized across intra-directory accesses.

The file key is stored in a hidden keyfile within that directory. The keyfile contains two encrypted copies of the file key; $K_u(K_e)$ and $K_g(K_e)$, where $K_u$ and $K_g$ correspond to the directory's owner and group. This precludes the possibility of hard links across directories, though this is also true of other file systems, such as AFS.

Figure 1:
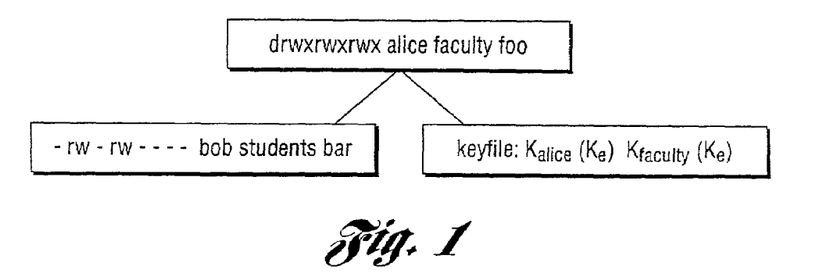

At first glance, per-directory keys restrict operations that are allowed by the underlying file system. All restrictions stem from the decision not to provide world keys; per-directory assignment imposes no new ones. For example, suppose Bob wants to create the file bar with group students in the directory foo owned by Alice in the group faculty, as shown in FIG. 1. Because the invention does not provide world keys, Bob must also be in the faculty group for the create to proceed. If the file is successfully created, then any other users must hold either $K_{alice}$ or $K_{faculty}$, despite the fact that bar names neither Alice nor faculty. This, too, follows from the lack of world keys, since such a user must hold $k_{alice}$ or $K_{faculty}$ to perform the lookup within foo.

In practice, this restriction is not overly limiting, since most directories contain only files with the same owner and group. A static analysis of several disks in a particular environment shows that over 92% of all directories contain only files whose owner and group are the same as its directory. Restricted to user directories, the percentage increases to more than 96%.

Per-directory file keys do allow a malicious user access that UNIX protections would otherwise disallow. If Alice replaced her kernel with one that ignores UNIX protection bits, then she would be able to read the file bar. This is because $K_e$ is covered by $K_{alice}$ and $K_{faculty}$, despite being owned by Bob and in the student group.

If one were to implement world keys as a policy matter, it would be straightforward to extend the keyfile to contain more than the two directory keys. Suppose a directory were world writable, and a user created a file with differing owner and group identifiers within it. That user would be able to decrypt the file key using the world key, and re-encrypt it with the appropriate group and owner keys. This solution allows operations that the lack world key prevents. However, it does not protect against malicious but trusted users, and in fact leaves much more of the file system open to such attacks.

Handling Keys Efficiently

Key acquisition time can be a significant expense. So, the invention overlaps key acquisition with disk operations whenever possible. However, disk layout policies and other optimizations often reduce the opportunity to hide latency. Therefore decrypted keys obtained from the token are cached. A simple LRU cache is used to exploit temporal locality. Since keys are small, a modest cache can cover a much longer access history than the file cache. For example, a 16K memory block can hold 512 key pairs.

Disk reads provide some opportunity for overlap. When a read requiring an uncached key commences, the invention asks the token to decrypt the key in parallel. Unfortunately, writes do not offer the same opportunity; the key must be in hand to encrypt the data before the write commences. However, it is likely that the decryption key is already in the key cache for both reads and writes. To read or write a file, one must first open it. This open requires a lookup in the enclosing directory. If this lookup is cached, the file key is also likely to be cached. If not, then key acquisition can be overlapped with any disk I/O required for lookup.

Neither overlapping nor caching applies to directory creation. Since this directory is new, it cannot have a cached key already in place. Since this is a write, the key must be acquired before the disk operation initiates. However, the invention does not need any particular key to associate with this directory; any key will do. Therefore, the invention can prefetch keys from the authentication token, encrypted with the current user's $K_u$ and $K_g$, to be used for directories created later. The initial set of fresh keys can be prefetched when the user binds a token to a laptop. Thereafter, if the number of fresh keys drops below a threshold, a background daemon can obtain more.

Key caching and prefetching greatly reduce the performance impact of laptop/token interactions. It is possible for workloads with high locality and low directory creation rates to progress for some time without ever contacting the token. However, frequent assurance that the token is present is the only defense against intruders.

To provide this assurance, a periodic challenge/response is added between the laptop and the user. The period is short enough that the time to discover an absence plus the time to secure the machine is less than that required for a physical attack. It must be long enough to impose only a light load on the system. The interval can be set to one second; this is long enough to produce no observable load, but shorter than the time to protect the laptop in the worst case. Thus, it does not contribute substantially to the window in which an attacker must work.

Departure and Return

When the token does not respond to key requests or challenges, the user is declared absent. All cached file system data must be encrypted and all file keys flushed to protect them from prying eyes. When the user returns, the invention must re-fetch all cached encryption keys and restore all encrypted data back to the cache. Ideally, this process should be transparent to the user; it should be completed before he resumes work.

There are two reasons why a laptop might not receive a response from the token. The user could truly be away, or the link may have dropped a packet. The invention recovers from the latter to avoid imposing a performance penalty on a still-present user. To accomplish this, the invention makes use of the expected round-trip time between the laptop and the token. Unlike wide-area round-trips, this time is known and relatively stable. The invention retries key requests if responses are not received within twice this round-trip number, and the invention allows a total of three retries. The invention does not employ exponential backoff, since losses are expected to be due to link noise, not congestion; congestion from nearby users is unlikely because of the short radio range.

If there is still no response, the user is declared absent, and the file system is secured. The invention first removes all name mappings from the name cache, forcing any new invention operations to block during lookup. Then, the list of cached pages belonging to the invention is "traversed", removing the clear text versions of the pages. There are two ways to accomplish this: writing dirty pages to disk and zeroing the cache, or encrypting all cached pages in place.

Writing out to disk has the attractive property that little work is required to secure the machine. Most pages will be clean, and do not need to be written. However, when the user returns, all of these pages must be recovered and decrypted. Since the pages to be recovered are likely to be scattered around the disk, this will take a long time.

Instead, the invention encrypts all of the cached pages in place. This widens the window of vulnerability, but not beyond what is tolerable given the goal of foiling a physical attack. For example, an IBM ThinkPad 570 with a 366 MHZ Pentium II CPU can encrypt 36 MB of data in less than 4.5 seconds.

While the user is absent, most disk operations block until the token is once again within range; the invention then resumes pending operations. This means that background processes cannot continue while the user is away, rendering the invention inappropriate for such tasks. However, the invention is built for a typical laptop user, with primarily interactive jobs. By nature, these require the user's presence—and thus the token—to progress.

Implementation

A preferred implementation of the invention consists of two parts: an in-kernel encryption module and a user-level authentication system. The kernel portion provides cryptographic I/O, manages file keys, and polls for the token's presence. The authentication system consists of a client on the user's laptop and a server on the token, communicating via a secured channel.

Figure 2:
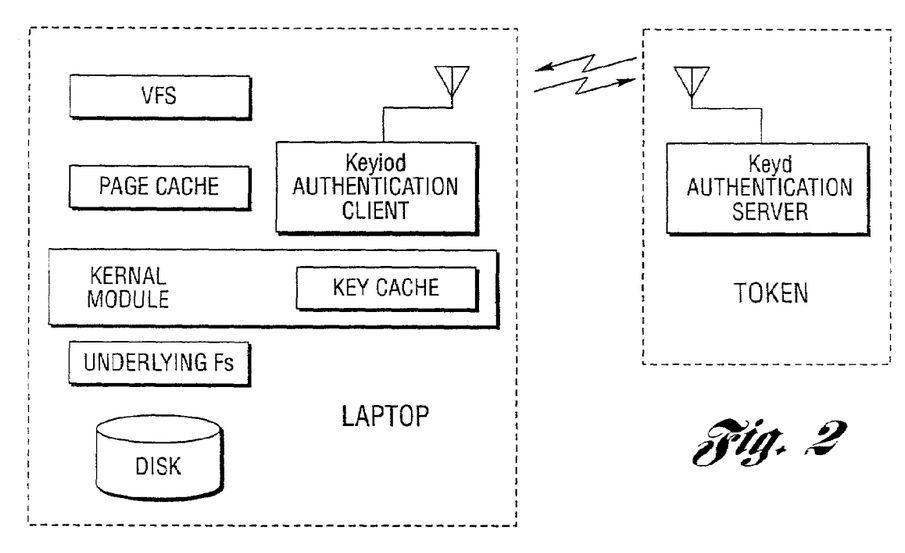
FIG. 2 is a block diagram of a system of the present invention wherein a kernel module handles cryptography of file I/O; an authentication client and an authentication server manage key decryption and detect token proximity; a key cache is included to improve performance.

FIG. 2 is a block diagram of a system of the invention. The kernel module handles all operations intended for the file system and forwards key requests to the authentication system. FiST, a tool for constructing stackable file systems, is used to build kernel-resident code. This code is integrated with the Linux 2.2.15 kernel.

The authentication system consists of two components. The client, keyiod, runs on the laptop, and the server, keyd, runs on the token; both are written in C. Keyiod handles session establishment and request retransmission. Keyd must respond to key decryption and polling requests. The processing requirements of keyd are small enough that it can be implemented in a simple, low-power device.

Kernel Module

All file system calls pass through the Virtual File System (VFS) layer. VFS provides an abstract view of a wide variety of file systems supported by the OS. A stackable file system inserts services between the VFS layers of an upper and lower file system. FiST implements a general mechanism for manipulating page data and file names; this makes it ideal for constructing cryptographic services. The FiST distribution includes a proof-of-concept cryptographic file system, Cryptfs.

FiST Module

The kernel module encrypts both file pages and file names with the Rijndael symmetric cipher. Rijndael was selected for two reasons. First, it has been chosen as NIST's Advanced Encryption Standard, AES. Second, it has excellent performance, particularly for key setup—a serious concern in the face of per-directory keys.

The invention preserves file sizes under encryption. File pages are encrypted in cipher block chaining (CBC) mode with a 16 byte block. Inode and page offsets are used to compute a different initialization vector for each page of a file. Tail portions that are not an even 16 bytes are encrypted in cipher feedback mode (CFB). CFB is chosen rather than ciphertext steading, since the invention is concerned with preventing exposure not providing integrity.

The invention does not preserve the size of file names under encryption; they are further encoded in Base-64, ensuring that encrypted file names use only printable characters. Otherwise, the underlying file system might reject encrypted file names as invalid. In exchange, limits on file and path name sizes are reduced by 25%. Cryptfs made the same decision for the same reason.

The kernel module performs two additional tasks. First, the module prefetches fresh file keys to be used during directory creation. Second, the module manages the storage of encrypted keys. Keys are stored in a file in the underlying file system, but are not made visible within the invention. This is done for transparency, not security. Keys are held in the kernel in both a central cache as well as the private data of each vnode for convenience.

Polling, Disconnection and Reconnection

The invention periodically polls the token to ensure that the user is still present. The polling period must be shorter than the time required for an adversary to obtain and inspect the laptop, but longer than a small multiple of network round-trip time. This window is between hundreds of milliseconds and tens of seconds. A period of one second is chosen; this generates unnoticeable traffic, but provides tight control. Demonstrated knowledge of the session key is sufficient to prove the token's presence. Therefore, a poll message need only be an encrypted exchange of nonces. The kernel is responsible for polling; it cannot depend on a user-level action to declare the token absent.

If the kernel declares the user absent, it must secure the file system. Cached data is encrypted, file keys are flushed, and both are marked invalid. A flag is added to the page structure to distinguish encrypted pages from those that were invalidated through other means. Most I/O in the invention blocks during the user's absence; non-blocking operations return the appropriate error code.

When keyiod reestablishes a secure connection with the token, two things happen. First, decrypted file keys are re-fetched from the token. Second, file pages are decrypted and made valid. As pages are made valid, any operations blocked on them resume. Overlapping key validation with page decryption is possible. However, the simpler scheme is sufficiently fast.

Authentication System

The authentication system is implemented in user space for convenience. Session keys between keyiod and keyd are established using RSA-style mutual authentication. This makes use of the public keys exchanged at bind time, as described in the "Laptop/Token Interaction" section. All laptop-token communication is protected and authenticated by this session key plus appropriate nonces.

Communication between the laptop and the token uses UDP rather than TCP, so that a particular re-transmission mechanism can be provided. This enables a more aggressive schedule, since congestion is not a concern. The user may be declared absent after three dropped messages; this parameter is tunable.

The token, in the form of keyd, holds all of a user's key-encrypting keys. It is assumed to be secure enough to prevent key exposure. If wearing the token does not provide the needed assurance, it can make use of secure hardware. Since session establishment is the most taxing operation required of keyd, and it is infrequent, keyd is easily implemented on embedded hardware.

Evaluation

In evaluating the invention, one must answer the following questions:

What is the cost of key acquisition?

What overhead does the invention impose? What contributes to this overhead?

Can the invention secure the machine quickly enough to prevent attacks when the user departs?

Can the invention recover the system state before a returning user resumes work?

To answer these questions, a prototype of the invention was, subjected to a variety of benchmarks. For these experiments, the client machine is an IBM ThinkPad 570, with 128 MB of physical memory, a 366 MHZ Pentium II CPU, and a 6.4 GB IDE disk drive with a 13 ms average seek time. The token is an IBM ThinkPad 560Z with a 300 MHZ PII. They are connected by an 802.11 wireless network running in ad hoc mode at 1 Mb/s. Some micro-benchmarks of communication are presented via a USB Bluetooth device and encryption on an HP Jornada 530, which has a 133 MHZ Hitachi processor. End-to-end benchmarks have not performed with this more realistic platform due to robustness problems with the Bluetooth modules.

Key Acquisition

The first task is to compare the costs of key acquisition with typical file access times. To do so, the elapsed time between the kernel's request for key decryption and the delivery of the key to the kernel is measured. The average cost to do so is 7.5 milliseconds, with a standard deviation of 5.6e-4. This is less than the average seek time of the disk in the laptops, though layout policy and other disk optimizations will tend to reduce seek costs.

This appealing result makes use of faster hardware and networking technology than one would expect of an authentication token. In order to quantify the impact of a more realistic implementation, the basic steps required to acquire a key and measure each of these for the target hardware is identified. The difference between the two platforms, multiplied by the number of key acquisitions in a benchmark, gives an upper bound on the additional overhead imposed by the slower hardware.

A key acquisition requires the following steps. The kernel sends a 128 byte request message, which must be decrypted on the token. The encrypted, 16 byte key must be decrypted. A response message—also 128 bytes—is then encrypted and sent.

A round-trip exchange of one 128 byte message requires 30 milliseconds on the Bluetooth modules. This is much lower than one would expect given nominal Bluetooth bandwidths; the proof performance is attributed to the USB interface that the modules use. A Compact Flash or PCMCIA interface is expected to perform substantially better.

The Jornada can encrypt a 16 byte block of data in 100 milliseconds—an order of magnitude slower than the Think-Pad 560. Key setup time is negligible in Rijndael, and decryption costs are identical to encryption. The total time required for key acquisition components is 31.7 milliseconds, yielding an additional overhead of less than 25 milliseconds per key acquisition.

The Invention's Overhead

A second goal is to understand the overhead imposed by the invention on typical system operation. Our benchmark is similar to the Andrew Benchmark in structure, but Apache 1.3.19 source tree was used. This source tree was 7.4 MB in size; when compiled, the total tree occupied 9.7 MB. The source tree was pre-configured for each trial of the benchmark, since the configuration step did not involve appreciable I/O in the test file system.

While the Andrew Benchmark is well known, it does have several shortcomings, chief among them is a marked dependence on compiler performance. In light of this, the invention was also subjected to three I/O-intensive workloads: directory creation, directory traversal, and tree copying. The first two highlight the cost of key creation and acquisition. The third measures the impact of data encryption and decryption.

Andrew Benchmark

The performance of Linux's Second Extended File System (Ext2fs) was compared against five stacking file systems: Base+, Cryptfs, the invention, ZIA-NP and ZIA-NPC. Base+ is a null stacked file system. It transfers file pages but provides no name translation. Cryptfs adds file and name encryption; it uses a single static key for the entire file system. Both Base+ and Cryptfs are samples from the FiST distribution. To provide a fair comparison, Blowfish was replaced with Rijndael in Cryptfs. ZIA-NPC obtains a key on every disk access; it provides neither caching nor prefetching of keys. ZIA-NP adds caching, while the invention adds both caching and prefetching. The stacked file systems are evaluated with Ext2fs as the underlying file system.

Each experiment consisted of five runs and the machine was rebooted between sets of tests. Before each set, the same source was compiled in a separate location. This ensures that the compiler and linker binaries are present in the file cache. Each run used separate source and destination directories to avoid caching files and name translations. The results are shown in Table 1; standard deviations are shown in parenthesis.

TABLE 1

| File System | Time, sec | Over Ext2fs (%) |
|---|---|---|
| Ext2fs | 52.20 (1.70) | — |
| Base+ | 54.13 (3.06) | 3.69% |
| Cryptfs (AES) | 56.68 (3.28) | 8.59% |
| The present invention | 56.84 (3.05) | 8.89% |
| ZIA-NP | 57.92 (3.05) | 10.95% |
| ZIA-NPC | 157.01 (8.14) | 200.77% |

Table 1 shows the performance of Ext2fs against five stacked file systems using a modified Andrew Benchmark. The invention has an overhead of less than 9% in comparison to an Ext2fs system and performs similarly to a simple single key encryption system, Cryptfs. After estimating the cost of using a less powerful token and Bluetooth instead of 802.11, it was found that the invention performs at 11% over Ext2fs.

The results for Ext2fs give baseline performance. The result for Base+ quantifies the penalty for using a stacking file system. This result is consistent with prior work. Cryptfs adds overhead for encrypting and decrypting file pages and names. The invention encompasses both of these penalties, plus any latencies due to key retrieval, token communication and key storage. For this benchmark, the invention imposes less than a 9% penalty over Ext2fs. Had the token been implemented on more realistic hardware, it would have imposed at most 25 milliseconds additional overhead for each of 44 key requests. This would result in an additional 1.1 seconds, yielding a total overhead of 11%.

Since ZIA-NP does not prefetch fresh keys, an additional network round-trip is inserted for each new directory. This adds 2%. Key caching is important; without it, ZIA-NPC is three times slower than the base file system.

Figure 3:
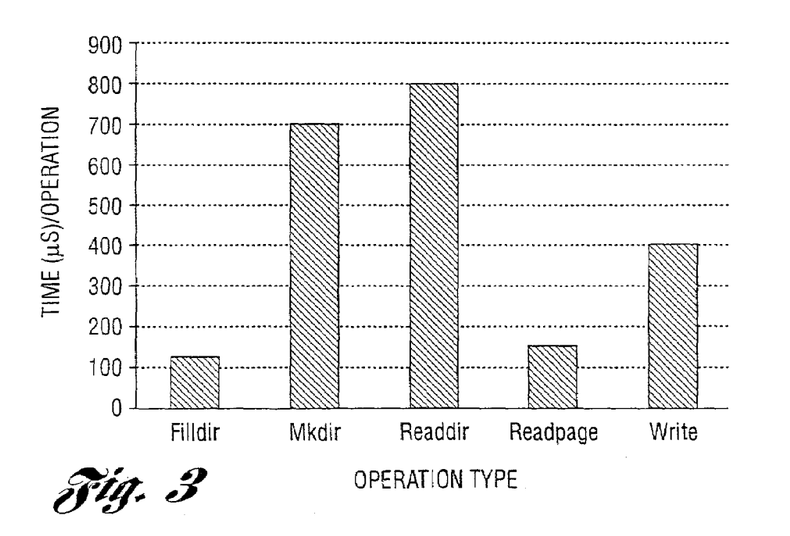
FIG. 3 is a bar graph which shows the per-operation overhead for the invention compared to the Base+file system; reading directory keys from disk is an expensive operation, as is encrypting and decrypting file pages; this leads to the overhead shown.

To examine the root causes of the invention's overhead, the 28 major file and inode operations were instrumented in both the invention and Base+. The difference between the two, normalized by the number of operations, gives the average time the invention adds to each. Most operations incur little or no penalty, but five operations incur measurable overhead. The results are shown in FIG. 3.

Overhead in each operation stems from the invention's encryption and key management functions. In Base+, the readpage and write functions merely transfer pages between the upper and lower file system. Since write is done asynchronously to the disk, this operation is relatively inexpensive. In the invention, the page is encrypted synchronously before writing to the lower file system. Also, during readpage, the pages are decrypted synchronously; this leads to the overhead shown. The invention's mkdir writes the keyfile to the disk. This adds an extra file creation to every mkdir. The readdir operation reads encrypted keys from disk. Finally, filldir sometimes waits for the key to be decrypted by the token and also decrypts the names of files, adding overhead.

It is somewhat surprising that the overhead in readpage is different from that in write. Encryption and decryption take the same amount of time, so one would expect these overheads to be identical. This discrepancy is not completely understood. However, it is believed that it is a consequence of exceptional noise in readpage times. All readpage operations go the disk subsystem; the time required to satisfy them depends on many factors related to the physical disk.

I/O Intensive Benchmarks

Although the Andrew Benchmark shows only a small overhead, some I/O intensive workloads incur larger penalties. Three benchmarks were conducted to quantify them. The first creates 1000 directories, each with an empty file. The second reads those directories and files using find. The third copies a large source tree within the file system.

The first experiment measured the time to create 1000 directories, each containing a zero length file. As before, the machine was rebooted between each set of experiments and each experiment ran in a separate directory. The results are shown in Table 2(a). Each new directory requires the invention to write a new keyfile to the disk, adding an extra write to each operation; the write-behind policy of Ext2fs keeps these overheads manageable. In addition, the file names are aid encrypted, accounting for the rest of the overhead.

TABLE 2(a)

| File System | Time, sec | Over Ext2fs (%) |
|---|---|---|
| Ext2fs | 8.85 (0.16) | — |
| Base+ | 8.96 (0.09) | 1.09% |
| Cryptfs | 9.23 (0.15) | 4.19% |
| The present invention | 10.50 (0.64) | 18.54% |

Table 2(a) shows the performance for the creation of 1000 directories and zero length files. Although the invention has a cache of fresh keys for directory creation, it must write those keyfiles to disk. This gives the overhead shown.

The next benchmark examines the invention's overhead on reading 1000 directories and a zero length file in each directory. This stresses keyfile reads and key acquisition. Without the empty file the invention does not need the decrypted key and the token would never be used. A find was run across the 1000 directories and files creating during the previous experiment. The machine was rebooted between the previous test and this one to make sure the name cache was not a factor. The results are shown in Table 2(b).

TABLE 2(b)

| File System | Time, sec | Over Ext2fs (%) |
|---|---|---|
| Ext2fs | 18.14 (2.99) | — |
| Base <+ ??> | 17.63 (2.91) | −2.83% |
| Cryptfs | 17.59 (2.87) | −3.04% |
| The present invention | 26.97 (2.43) | 48.67% |

Table 2(b) shows the performance for reading 1000 directories, each containing one zero length file. In this case, the invention synchronously acquires each file key. This extra round-trip in each directory read causes the overhead shown.

The results show a very large overhead for the invention. This is not surprising since a file layout with the smallest degree of directory locality possible was created. The invention is forced to fetch 1000 keys, one for each directory; there is no locality for key caching to exploit. This inserts a network round-trip into reading the contents of each directory, accounting for an extra 7.5 milliseconds per directory read. The differences between Base+, Cryptfs and Ext2fs are not statistically significant.

Each directory read in the invention requires a keyfile read and a key acquisition in addition to the work done by the underlying Ext2fs. Interestingly, the amount of unmasked acquisition time plus the time to read the keyfile was similar to the measured acquisition costs. To better understand this phenomenon, the internals of the directory operations were instructed. Surprisingly, the directory read completed in a few tens of microseconds, while the keyfile read was a typical disk access. It is believed that this is because, in the benchmark, keyfiles and directory pages were always placed in the same track. In this situation, the track buffer will contain the directory page before it is requested.

It is likely that an aged file system would not show such consistent behavior. Nevertheless, moving keyfiles out of directories and into a separate location in the lower file system are being considered. Since keys are small, one could read them in batches, in the hope of prefetching useful encrypted file keys. When encrypted keys are already in hand, the directory read would no longer be found in the track buffer, and would have to go to disk. However, this time would be overlapped with key acquisition, reducing total overheads.

The final I/O intensive experiment was to copy the Pine 4.21 source tree from one part of the file system to another. The initial files were copied in and then the machine was rebooted to avoid hitting the page cache. This measured data intensive operations. The Pine source is 40.4 MB spread across 47 directories. The results are shown in Table 3. In light of the previous experiments it is clear why Cryptfs and the invention are slow in comparison to Base+ and Ext2fs. Each file page is synchronously decrypted after a read and encrypted before a write.

TABLE 3

| File System | Time, sec | Over Ext2fs (%) |
|---|---|---|
| Ext2fs | 13.70 (0.78) | — |
| Base+ | 16.87 (1.15) | 23.13% |
| Cryptfs | 23.78 (2.30) | 73.52% |
| The present invention | 23.78 (0.77) | 73.51% |

Table 3 shows the performance for copying a 40 MB source tree from one directory in the file system to another. Synchronously decrypting and encrypting each file page adds overhead to each page copy. This is true for the invention as well as Cryptfs.

Departure and Return

Figure 4:
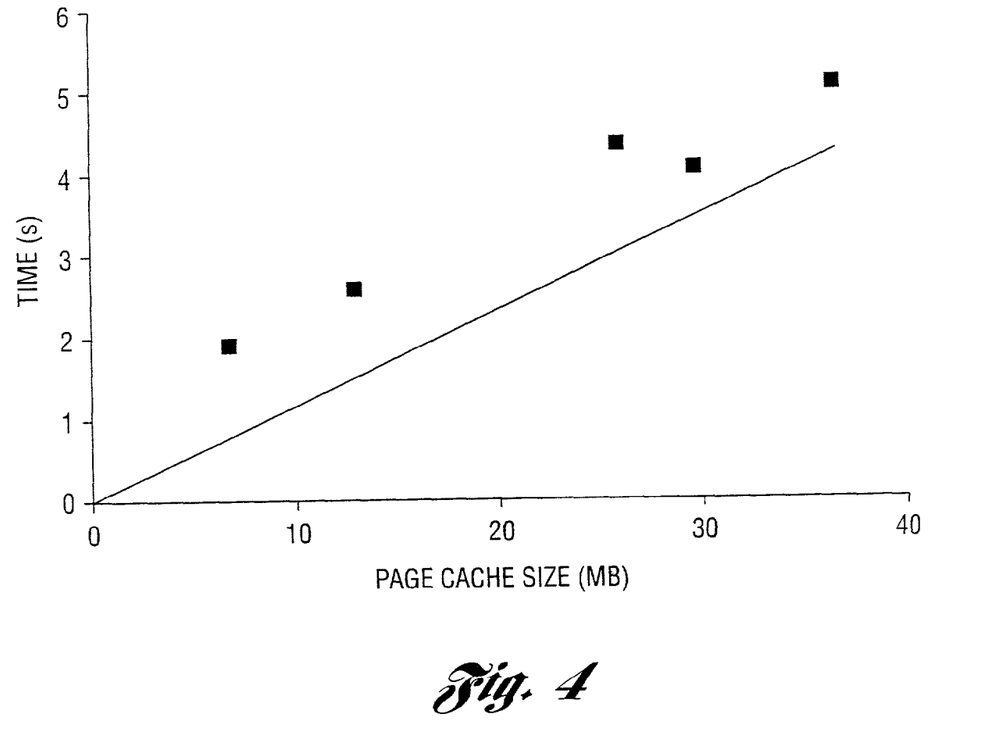
FIG. 4 is a graph which shows the disconnection encryption time and reconnection decryption time; the line shows the time required to encrypt all the file pages when the token moves out of range; the blocks show the time required to refetch all the cached keys and decrypt the cached file pages.

In addition to good performance, the invention has two additional properties. For security, all file page data are encrypted soon after a user departs. To be usable, the invention should restore the machine to the pre-departure state before the user resumes work. When the user leaves, the system encrypts the file pages in place. When the user returns, the invention requests decryption of all keys in the key cache and then decrypts the data in the page cache. To measure both disconnection and reconnection time, several source directories of various sizes were copied into the invention, the token was removed, and then brought back into range. FIG. 4 shows these results. The line shows the time required to secure the file system, and points represent the time required to restore it.

The encryption time depends solely on the amount of data in the page cache. Unsurprisingly, encryption time is linear in page cache size. Decryption is also linear, though key fetching requires a variable amount of time due to the unknown number of keys in the cache. It is believed that a window of six seconds is too short for a thief to obtain the laptop and examine the contents of the page cache. The range of the Bluetooth device is such that the user should not witness the system recovering the file system. Once the user is within range, he preferably walks to the laptop, sits down, and resumes work. This amount of time is likely to be greater than six seconds as well.

Related Work

The invention is the first method and system to provide encrypted filing services that defend against physical attack while imposing minimal usability and performance burdens on the trusted user. The invention accomplishes this by separating the long-term authority to act on the user's behalf from the entity performing the actions. The actor holds this authority only over the short term, and refreshes it as necessary.

There are a number of file systems that provide transparent encryption; the best known is CFS. CFS is built as an indirection layer between applications and an arbitrary underlying file system. This layer is implemented as a "thin" NFS server that composes encryption atop some other, locally-available file system. Keys are assigned on a directory tree basis. These trees are exposed to the user; the secure file system consists of a set of one or more top-level subtrees, each protected by a single key.

When mounting a secure directory tree in CFS, the user must supply the decryption keys via a pass-phrase. These keys remain in force until the user consciously revokes them. This is an explicit design decision, intended to reduce the burden on users of the system. In exchange, the security of the system is weakened by vesting long-term authority with the laptop. CFS also provides for the use of smartcards to provide keys, but they too are fetched at mount time rather than periodically. Even if fetched periodically, a user would be tempted to leave the smartcard in the machine most of the time.

CFS' overhead can be substantial: 36% for compilation, 44% for a meta-data updates, and factors of six or more for I/O-intensive workloads. Performance on I/O-bound workloads is limited primarily by the cross-domain copies required by NFS-style indirection. The use of the DES cipher accounts for the remainder. It is important to note that these overhead figures were obtained on very different hardware than that described above, and CFS' overheads should not be directly compared with the invention's.

One way to implement a cryptographic file system more efficiently is to place it in the kernel, avoiding cross-domain copies. This task is significantly simplified by a stackable file system infrastructure. Stackable file systems provide the ability to interpose layers below, within, or above existing file systems, enabling incremental construction of services.

FiST is a language and associated compiler for constructing portable, stackable file system layers. FiST was used in the implementation of the invention, though use of the virtual memory and buffer cache mechanisms native to Linux will require substantial effort to port to other operating systems. FiST is a useful tool in constructing file system services.

Cryptfs is the most complete prior example of a stacking implementation of encryption. It was first implemented as a custom-built, stacked layer, and later built as an example use of FiST. Cryptfs—in both forms—shares many of the goals and shortcomings of CFS. A user supplies his keys only once; thereafter, the file system is empowered to decrypt files on the user's behalf. Cryptfs significantly outperforms CFS, and benchmarks have shown Cryptfs in an even better light. This is primarily due to the replacement of Blowfish with Rijndael.

Applications often hold sensitive data in their address spaces. If any of this state is paged out to disk, it will be available to an attacker much as an unencrypted file system would be. Provos provides a system for protecting paging space using per-page encryption keys with short lifetimes. The invention is complimentary to this system; the invention protects file system state, while Provos' system protects application address spaces.

Conclusion

Because laptops are vulnerable to theft, they require additional protection against physical attacks. Without such protection, anyone in possession of a laptop is also in possession of all of its data. Current cryptographic file systems do not offer this protection, because the user grants the file system long-term authority to decrypt on his behalf. Closing this vulnerability with available mechanisms— passwords, secure hardware, or biometrics—would place intolerable burdens on the user, encouraging him to disable security entirely.

The present invention provides a solution to this problem. In the invention, a user wears an authentication token that retains the long-term authority to act on his behalf. The laptop, coupled to the token by a short-range wireless link, obtains this authority only when it is needed. Despite the additional communication required, this scheme imposes an overhead of only 11% above the local file system for representative workloads; this is less than 2.2% beyond the costs of simply encryption.

If the user ever leaves, the laptop encrypts any cached file system data. For caches as large as 36 MB, this process takes less than five seconds—much less time than would be required for a nearby thief to examine data. Once the user is back in range, the file system is restored to pre-departure state within just over five seconds. The user never notices a performance loss on return, though the machine is incapable of I/O in his absence. The invention may become an indispensable part of laptop security.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system to maintain data stored on a portable computer secure, the system comprising:
    an authorization client for use on the portable computer for making requests;
    a security device to be associated with an authorized user of the portable computer and including an authorization server for supplying responses to the requests;
    a communication subsystem for wirelessly communicating the requests and the responses to the server and the client, respectively, within a range; and
    a cryptographic subsystem for use on the portable computer for encrypting the data to obtain corresponding encrypted data when the security device is outside the range of the communication subsystem and for decrypting the encrypted data when the security device is back within the range;
    wherein the requests include cryptographic requests for cryptographic information and wherein the server supplies the cryptographic information in response to the cryptographic requests and wherein the cryptographic subsystem utilizes the cryptographic information to either encrypt or decrypt the data.

2. The system as claimed in claim 1 wherein the requests include polling requests.

3. The system as claimed in claim 1 wherein the cryptographic information includes keys.

4. The system as claimed in claim 3 wherein the keys are encrypted.

5. The system as claimed in claim 3 wherein the keys include user and group keys.

6. The system as claimed in claim 1 further comprising a mechanism for establishing a binding between the portable computer and the security device to ensure that the security device only responds to a portable computer with a valid binding.

7. The system as claimed in claim 1 wherein the security device is an authorization token.

8. The system as claimed in claim 1 wherein the computer has a low speed memory and high speed memory and wherein the data stored in the high speed memory is not encrypted and the data stored in the low speed memory is encrypted.

9. The system as claimed in claim 1 wherein the cryptographic subsystem includes encrypted keys and wherein the cryptographic information includes keys for decrypting the encrypted keys.

10. The system as claimed in claim 1 wherein the requests including the polling requests are encrypted.

11. A method to maintain data stored on a portable computer secure, the method comprising:

providing an authorization client for use on the portable computer for making requests;

providing a security device to be associated with an authorized user of the portable computer and including an authorization server for supplying responses to the requests;

wirelessly communicating the requests and the responses to the server and the client, respectively, within a range;

encrypting the data to obtain corresponding encrypted data when the security device is outside the range; and decrypting the encrypted data when the security device is back within the range;

wherein the requests include cryptographic requests for cryptographic information and wherein the server supplies the cryptographic information in response to the cryptographic requests and wherein the cryptographic information is used to either encrypt or decrypt the data.

12. The method as claimed in claim 11 further comprising establishing a binding between the portable computer and the security device to ensure that the security device only responds to a portable computer with a valid binding.

* * * * *